(12) United States Patent
Ebert et al.

(10) Patent No.: US 6,350,798 B1
(45) Date of Patent: Feb. 26, 2002

(54) USE OF SACCHARIN FOR STABILIZING THERMOPLASTIC, AROMATIC POLYCARBONATES

(75) Inventors: Wolfgang Ebert, Krefeld; Ralf Hufen, Duisburg; Wilfried Haese, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/445,624

(22) PCT Filed: Jun. 8, 1998

(86) PCT No.: PCT/EP98/03425

§ 371 Date: Dec. 9, 1999

§ 102(e) Date: Dec. 9, 1999

(87) PCT Pub. No.: WO98/58996

PCT Pub. Date: Dec. 30, 1998

(30) Foreign Application Priority Data

Jun. 20, 1997 (DE) .......................... 197 26 195

(51) Int. Cl.[7] .............................. C08L 69/00; C08K 5/46
(52) U.S. Cl. ............................................................ 524/83
(58) Field of Search ........................................... 524/83

(56) References Cited

U.S. PATENT DOCUMENTS

| 4,782,103 A | * 11/1988 | Ogoe |
| 4,940,588 A | 7/1990 | Sparks et al. |
| 4,952,402 A | 8/1990 | Sparks et al. |
| 5,210,124 A | * 5/1993 | Hovatter |
| 5,354,556 A | 10/1994 | Sparks et al. |
| 5,684,062 A | * 11/1997 | Ebert |

FOREIGN PATENT DOCUMENTS

| DE | 3743136 | | 9/1988 |
| EP | 014322 | * | 8/1980 |
| EP | 742260 | * | 11/1996 |
| JP | 041092 | * | 10/1972 |
| JP | 297454 | * | 11/1989 |
| JP | 225558 | * | 9/1990 |
| SU | 1558939 | * | 4/1990 |

* cited by examiner

Primary Examiner—David J. Buttner
(74) Attorney, Agent, or Firm—Joseph C. Gil; Aron Pries; James R. Franks

(57) ABSTRACT

A thermoplastic molding composition comprising aromatic polycarbonate, saccharine and a compound having at least one ester group in its structure is disclosed. The inventive composition is characterized in its improved stability and hence suitable for the preparation of stable films, compact discs and sheets.

15 Claims, No Drawings

USE OF SACCHARIN FOR STABILIZING THERMOPLASTIC, AROMATIC POLYCARBONATES

Thermoplastic aromatic polycarbonates are in themselves thermally stable. If these polycarbonates contain low molecular weight additives containing ester groups, for example mould release agents, a slight reduction in the molecular weight of the aromatic polycarbonates occurs in the melt, for example during extrusion or during injection moulding treatment, as a result of transesterification with the additive. This disadvantage is of consequence in the event of repeated processing of these additive-containing polycarbonates or indeed in the event of re-use of polycarbonate waste material.

This disadvantage arises in particular when the thermoplastic polycarbonate contains impurities in the form of traces of alkali compounds, alkaline-earth compounds or heavy metal compounds.

It has surprisingly been discovered that the addition of saccharine in amounts of from 0.001 wt. % to 5.0 wt. %, preferably from 0.005 wt. % to 1.5 wt. %, extensively prevents this undesirable transesterification of aromatic polycarbonates which contain additives containing ester groups.

The present invention thus provides the use of saccharine in amounts of from 0.001 wt. % to 5.0 wt. %, preferably from 0.005 wt. % to 1.5 wt. %, based on 100 wt. % polycarbonate, to stabilise thermoplastic aromatic polycarbonates which contain from 0.01 wt. % to 5 wt. %, preferably from 0.05 wt. % to 3 wt. %, again based on 100 wt. % polycarbonate, of ester group-containing additives.

The present invention further provides polycarbonate moulding compositions containing
A) 100 wt. % thermoplastic aromatic polycarbonate, and additionally
B) 0.001 wt. % to 5.0 wt. %, preferably from 0.005 wt. % to 1.5 wt. %, based on 100 wt. % of A, of saccharine, and additionally
C) 0.01 wt. % to 5 wt. %, preferably from 0.05 wt. % to 3 wt. %, again based on 100 wt. % of A, of ester group-containing additives.

Thermoplastic aromatic polycarbonates covered by the present invention include both homopolycarbonates and copolycarbonates; the polycarbonates may, in known manner, be either linear or branched.

These polycarbonates are produced in the known way from diphenols, carbonic acid derivatives, optionally chain terminators and optionally branching agents.

Details of polycarbonate production are to be found in many patent specifications filed over approximately the last 40 years. Reference will be made here, by way of example, merely to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648–718 and finally to Drs. U. Grigo, K. Kircher and P. R. Müller "Polycarbonates" in Becker/Braun, Kunststoff-Handbuch, Volume 3/1, Polycarbonates, Polyacetals, Polyesters, Cellulose Esters, Carl Hanser Verlag Munich, Vienna 1992, pages 117–299.

Diphenols suitable for producing polycarbonates are, for example, hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)-diisopropylbenzenes, together with their ring-alkylated and ring-halogenated compounds.

Preferred diphenols are 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl) sulfone, 2,4-bis-(3,5-dimethyl-4-hydroxyphenyl)-2-methylbutane, 1,1-bis-(3,5-dimethyl-4-hydroxyphenyl)-p/m-diisopropylbenzene, 2,2-bis-(3,5-dichloro-4-hydroxyphenyl)-propane, 2,2-bis-(3,5-dibromo-4-hydroxyphenyl)propane, 1,1-bis-(4-hydroxyphenyl)-3,3,5-trimethylcyclohexane, 1,1-bis-(4-hydroxyphenyl)-1-phenylethane and 1,1-bis-(4-hydroxyphenyl)cyclohexane.

Diphenols which are particularly preferred are 2,2-bis-(4-hydroxyphenyl)propane, 2,2-bis-(3,5-dimethyl-4-hydroxyphenyl)propane, 2,2-bis-(3,5-dichloro-4-hydroxyphenyl)-propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

These and other suitable diphenols are described, for example, in U.S. Pat. Nos. 3,028,635, 2,999,835, 3,148,172, 2,991,273, 3,271,367, 4,982,014 and 2,999,846, in German published patent applications 1 570 703, 2 063 050, 2 036 052, 2 211 956 and 3 832 396, French patent specification 1 561 518, the monograph "H. Schnell, Chemistry and Physics of Polycarbonates, Interscience Publishers, New York 1964" and in Japanese published patent applications 62039/1986, 62040/1986 and 105550/1986.

In the case of homopolycarbonates, only one diphenol is used, whereas, in the case of co-polycarbonates, several diphenols are used.

Suitable carbonic acid derivatives are, for example, phosgene or diphenyl carbonate.

Both monophenols and monocarboxylic acids are suitable for use as chain terminators. Suitable monophenols are phenol itself, alkylphenols such as cresols, p-tert.-butylphenol, p-n-octylphenol, p-iso-octylphenol, p-n-nonylphenol, and p-iso-nonylphenol, halophenols such as p-chlorophenol, 2,4-dichlorophenol, p-bromophenol and 2,4,6-tribromophenol together with mixtures thereof.

Suitable monocarboxylic acids are benzoic acid, alkylbenzoic acids and halobenzoic acids.

Preferred chain terminators are phenols of the formula (I)

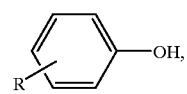

(I)

in which
R is a branched or unbranched $C_8$ and/or $C_9$ alkyl residue.

The quantity of chain terminator to be used amounts to from 0.1 mol % to 5 mol %, based on the number of mol of the diphenols used in each case. Chain terminators may be added before, during or after phosgenation.

Suitable branching agents are the trifunctional or more than trifunctional compounds known in polycarbonate chemistry, in particular those with three or more than three phenolic OH groups.

Suitable branching agents are, for example, phloroglucinol, 4,6-dimethyl-2,4,6-tri-(4-hydroxyphenyl)-

2-heptene, 4,6-dimethyl-2,4,6-tri-(4-hydroxyphenyl) heptane, 1,3,5-tri-(4-hydroxyphenyl)benzene, 1,1,1-tri-(4-hydroxyphenyl)ethane, tri-(4-hydroxyphenyl) phenylmethane, 2,2-bis-[4,4-bis-(4-hydroxyphenyl) cyclohexyl]propane, 2,4-bis-(4-hydroxyphenyl-isopropyl) phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)-orthoterephthalic acid ester, tetra-(4-hydroxyphenyl)-methane, tetra-(4-(4-hydroxyphenylisopropyl)phenoxy)-methane and 1,4-bis-(4', 4"-dihydroxytriphenyl)methyl)-benzene together with 2,4-dihydroxybenzoic acid, trimesic acid, cyanuric chloride and 3,3-bis-(3-methyl-4-hydroxyphenyl)-2-oxo-2,3-dihydroindole.

The quantity of branching agent optionally to be used amounts to from 0.05 mol % to 2 mol %, again based on the number of mol of the diphenols used in each case.

The branching agents may either be present with the diphenols and the chain terminators in the initial aqueous alkaline phase or be added in solution in an organic solvent prior to phosgenation. In the case of a trans-esterification process, the branching agents are added together with the diphenols.

All these measures for producing thermoplastic polycarbonates are familiar to the person skilled in the art.

The polycarbonates to be used according to the invention have average weight average molecular weights Mw, determined by measuring the relative viscosity in $CH_2Cl_2$ at 25° C. with a concentration of 0.5 g in 100 ml $CH_2Cl_2$, of between 10,000 and 80,000, preferably between 15,000 and 40,000.

Ester group-containing additives for thermoplastic polycarbonates are, in particular, plasticisers and mould release agents, as described in the literature and also used for processing thermoplastic polycarbonates.

The ester group-containing additives according to component C) may be completely esterified compounds or partial esters with non-esterified OH groups or non-esterified carboxyl groups.

The ester group-containing additives according to component C) are synthesised from aliphatic monoalcohols, aliphatic dialcohols, aliphatic trialcohols, aliphatic tetrols, aliphatic pentols and/or aliphatic hexols having 1 to 15 C atoms, preferably 2 to 10 C atoms and particularly preferably 3 to 6 C atoms, and aliphatic monocarboxylic acids, aliphatic dicarboxylic acids and/or aliphatic tricarboxylic acids having 3 to 34 C atoms, preferably 10 to 24 C atoms and particularly preferably 12 to 18 C atoms.

The ester group-containing additives have average molecular weights n (number average, determined by end group assay) of from 100 to 3000, preferably from 300 to 1000.

Examples of aliphatic alcohols are ethanol, propanol, butanol, ethylene glycol, glycerol, pentaerythritol, 1,4-butanediol, 1,6-hexanediol, 1,10-decanediol, hexanol, n-decyl alcohol, lauryl alcohol, myristyl glycol, t-amyl alcohol, 1,2,4-butanetriol, 1,2,6-hexanetriol, inositol, sorbitol, erythritol and xylitol.

Examples of aliphatic carboxylic acids are butyric acid, isovaleric, caproic, caprylic, capric, lauric, myristic, palmitic, stearic, arachidic, behenic, lignoceric and cerotic acid, malonic acid, succinic acid, glutaric acid, adipic acid, sebacic acid, dodecanedioic acid and thapsic acid.

Examples of ester group-containing additives according to component C) are ethyl stearate, glycerol monostearate, distearate and tristearate, butyl laurate, hexyl laurate, pentaerythritol tetralaurate, tetrapalmitate, tetra-stearate, pentaerythritol trilaurate, tripalmitate and tristearate, sebacic acid monobutyl ester and dibutyl ester together with dodecanedioic acid monobutyl ester and dibutyl ester.

The ester group-containing additives are known from the literature or may be produced according to processes known from the literature. (See for example U.S. Pat. No. 3,186,961, JA-Sho-47-41092, U.S. Pat. No. 3,784,595, JA-Sho-49-11949, JA-Sho-49-55752 and U.S. Pat. No. 4,131,575.)

The saccharine used according to component B) in the moulding compositions according to the invention is normal saccharine as available internationally in pharmaceutical grade under the names "Saccharine 550" or "insoluble saccharine".

It exhibits the formula

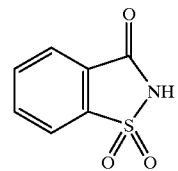

It should preferably be free of alkali ions, in particular sodium ions, or may contain at most 100 ppm alkali ions, in particular sodium ions.

Contaminated saccharine arising during production has therefore to be purified prior to use according to the invention in the known way by recrystallisation.

A controlled release powder is known from DE-OS 3 538 429 for use in edible pharmaceutical and other compositions, said powder being characterized in that it contains individual micro-particles which contain an active component and optionally an excipient mixed intimately with at least one non-toxic polymer (claim 1).

Polycarbonate is mentioned, inter alia, as the polymer (claim 5), while saccharine is named as the active component. (Page 13, lines 36/37 of the DE-OS). Surface active agents may act as the excipient (page 18, lines 13 to 33 of the DE-OS) (of also the corresponding U.S. Pat. No. 5,354, 556).

Use according to the invention is not affected thereby, since the invention does not seek to achieve controlled release.

Cell and tissue culture substrates are known from DE-OS 3 743 136, which consist of synthetic materials and may contain one or more special compounds. Polycarbonate may also serve as the synthetic material (claim 1 of DE-OS 3743136), saccharine acting as the special compound (claim 24).

Use according to the invention is not affected thereby. According to U.S. Pat. No. 4 782 103, polycarbonates containing UV stabilisers are known which additionally contain sulfonimides. Saccharine may also be used for this purpose. (Column 2, line 16). Mould release agents may also be added (column 3, line 20). However the object of the U.S. patent is different.

In EP-A 0 742 260 (Le A 30 889-EP), saccharine is used to stabilise thermoplastic polycarbonates against the discolouring effect of β,γ rays. (Page 1 of the application).

Other mould release agents may also be added (page 5, line 13), but ester group-containing additives are not mentioned.

The object of EP-A 0 742 260 does not permit any conclusions to be drawn as to the synergistic effect according to the present invention.

Components B) and C) may be worked into the thermoplastic polycarbonate resins in the known way either by means of the melt at temperatures of from 200° C. to 360° C., preferably from 260° C. to 320° C., or by dissolving the polycarbonates in known inert solvents such as $CH_2Cl_2$.

The melt, including the components B) and C) mixed therein, is extracted via the extruder, cooled and pelletised.

The polycarbonate solutions, including the components B) and C), are concentrated and either formed directly into films by pouring or evaporated via the extruder and pelletised or precipitated out of the solutions by the addition of known precipitating agents such as toluene and isolated as a powder.

The polycarbonate moulding compositions according to the invention may be processed in the known way to form any desired moulded articles, for example they may be injection moulded using known machines at temperatures of from 200° C. to 360° C. Examples of such moulded articles other than films, are solid sheets, twin-walled sheets and compact discs.

The present invention thus also provides use of the polycarbonate moulding compositions according to the invention for the production of films, solid sheets, twin-walled sheets and compact discs.

Other conventional additives, such as for example organic phosphites, optionally combined with monomeric or oligomeric epoxides, flame retardants, in particular those containing fluorine, such as polyperfluoroethylene, colouring agents, pigments, anti-static agents, fillers and reinforcing materials, may also be added in conventional amounts to the polycarbonate moulding compositions according to the invention before, during or after processing thereof.

Other thermoplastics may also be added, for generally non-transparent applications, in the known way to the polycarbonate moulding compositions according to the invention in amounts of from 2 wt. % to 30 wt. %, preferably from 5 wt. % to 25 wt. % and in particular from 8 wt. % to 20 wt. %, based on 100 wt. % polycarbonate resin.

Other suitable thermoplastics are, for example, aromatic polyester carbonates, polyalkylene terephthalate, EPDM polymers, polystyrene and styrene-based co- and graft copolymers, such as in particular ABS.

The polycarbonate moulding compositions according to the invention may be used as moulded articles wherever thermoplastic polycarbonates have hitherto been used, that is to say in vehicle construction, the electrical industry, as safety partitions, roof coverings in the building industry, as lamp covers, prisms and in data storage technology.

EXAMPLES

The following data were measured using test plates.

The following test plates were obtained by compounding of the above-mentioned compositions using a twin screw extruder ZSK 32 and subsequent production of the test plates by the injection moulding process.

Compounding: composition temperature 300° C. Test piece production: composition temperature 300° C.; mould temperature 90° C.

Test 1

| Composition | Solution viscosity ($\eta_{rel}$) | MVR |
|---|---|---|
| Reextruded polycarbonate | 1.282 | 8.42 |
| Polycarbonate + 0.75% PPG | 1.286 | 9.16 |
| Polycarbonate + 0.75% PPG + 0.5% Saccharine A | 1.278 | 11.26 |
| Polycarbonate + 0.75% PPG + 0.5% Saccharine B | 1.279 | 12.12 |

Saccharine A: Na content according to atomic absorption: 24 ppm/27 ppm

Saccharine B: Na content according to atomic absorption: 2500 ppm/2500 ppm

Polycarbonate: Macrolon 2808 made by Bayer AG was used, having a solution viscosity of $(\eta_{rel})$=1.294

MVR: according to ISO 1133A, at 300° C. and a weight of 1.2 kg

%: percentage by weight in the total mixture

PGG: polypropylene glycol having an average molecular weight (weight average) of approximately 2500.

As the values show, the solution viscosities and the melt viscosities of the two saccharine-containing compounds differ only insignificantly within the margins of error, although the Na content varies markedly.

Replication of the test produced the following results:

Test 2

| Composition | Solution viscosity ($\eta_{rel}$) | MVR |
|---|---|---|
| Reextruded polycarbonate | 1.288 | 7.82 |
| Polycarbonate + 0.75% PPG | 1.287 | 9.03 |
| Polycarbonate + 0.75% PPG + 0.5% Saccharine A | 1.279 | 10.29 |
| Polycarbonate + 0.75% PPG + 0.5% Saccharine B | 1.278 | 10.50 |

The results of the first test are confirmed: no significant reduction in solution viscosity and no increase in MVR.

Two sterilisation cycles subsequently carried out at 125° C. under steam using the test plates obtained in the above test produced the following values:

| Composition | Solution viscosity ($\eta_{rel}$) | | |
|---|---|---|---|
| | Start | 1st cycle | 2nd cycle |
| Reextruded polycarbonate | 1.288 | 1.289 | 1.288 |
| Polycarbonate + 0.75% PPG | 1.287 | 1.286 | 1.285 |
| Polycarbonate + 0.75% PPG + 0.5% Saccharine A | 1.279 | 1.278 | 1.279 |
| Polycarbonate + 0.75% PPG + 0.5% Saccharine B | 1.278 | 1.280 | 1.278 |

Again, there is no notable variation in the values. Thus, no superproportional hydrolysis has occurred, as would have been expected in the compounds containing saccharine B owing to its high sodium content.

What is claimed is:

1. A polycarbonate molding composition comprising:
   A) 100 wt. % thermoplastic aromatic polycarbonate;
   B) 0.001 wt. % to 5.0 wt. %, based on 100 wt. % of A), of insoluble saccharin containing less than 100 ppm alkali ions; and C) 0.01 wt. % to 5 wt. %, based on 100 wt. % of A), of an ester group-containing additive.

2. The polycarbonate molding composition of claim 1 wherein said insoluble saccharin B) is free of alkali ions.

3. Films, prepared from the polycarbonate molding composition of claim 1.

4. Cladding sheets, prepared from the polycarbonate molding composition of claim 1.

5. Polymer twin-walled sheets, prepared from the polycarbonate molding composition of claim 1.

6. Compact discs, prepared from the polycarbonate molding composition of claim 1.

7. A thermoplastic molding composition comprising:

(A) aromatic polycarbonate;

(B) 0.001 to 5.0 percent of insoluble saccharin containing less than 100 ppm alkali ions; and (C) 0.01 to 5 percent of a compound having a number average molecular weight of 100 to 3000, said compound having at least one ester group in its structure, said percents being relative to the weight of said composition.

8. The composition of claim 7 wherein said compound (C) is a plasticizer.

9. The composition of claim 7 wherein said compound (C) is a mold release agent.

10. The composition of claim 7 wherein said compound (C) is completely esterified.

11. The composition of claim 7 wherein said compound (C) is a partial ester containing non-esterified OH groups.

12. The composition of claim 7 wherein said compound (C) is a partial ester containing at least one non-esterified carboxyl group.

13. The composition of claim 7 wherein said compound (C) is a product of a reaction of: (i) at least one member selected from the group consisting of $C_{1-5}$ aliphatic monoalcohol, aliphatic dialcohol, aliphatic trialcohol, aliphatic tetrol, aliphatic pentol and aliphatic hexol; with (ii) at least one member selected from the group consisting of $C_{3-34}$ aliphatic monocarboxylic acid, aliphatic dicarboxylic acid and aliphatic tricarboxylic acid.

14. An article of manufacture comprising the composition of claim 7.

15. The thermoplastic molding composition of claim 7 wherein said insoluble saccharin (B) is free of alkali ions.

* * * * *